Jan. 6, 1925.
H. FLETCHER
1,522,294
ELECTRICAL TESTING SYSTEM
Filed Jan. 7, 1922
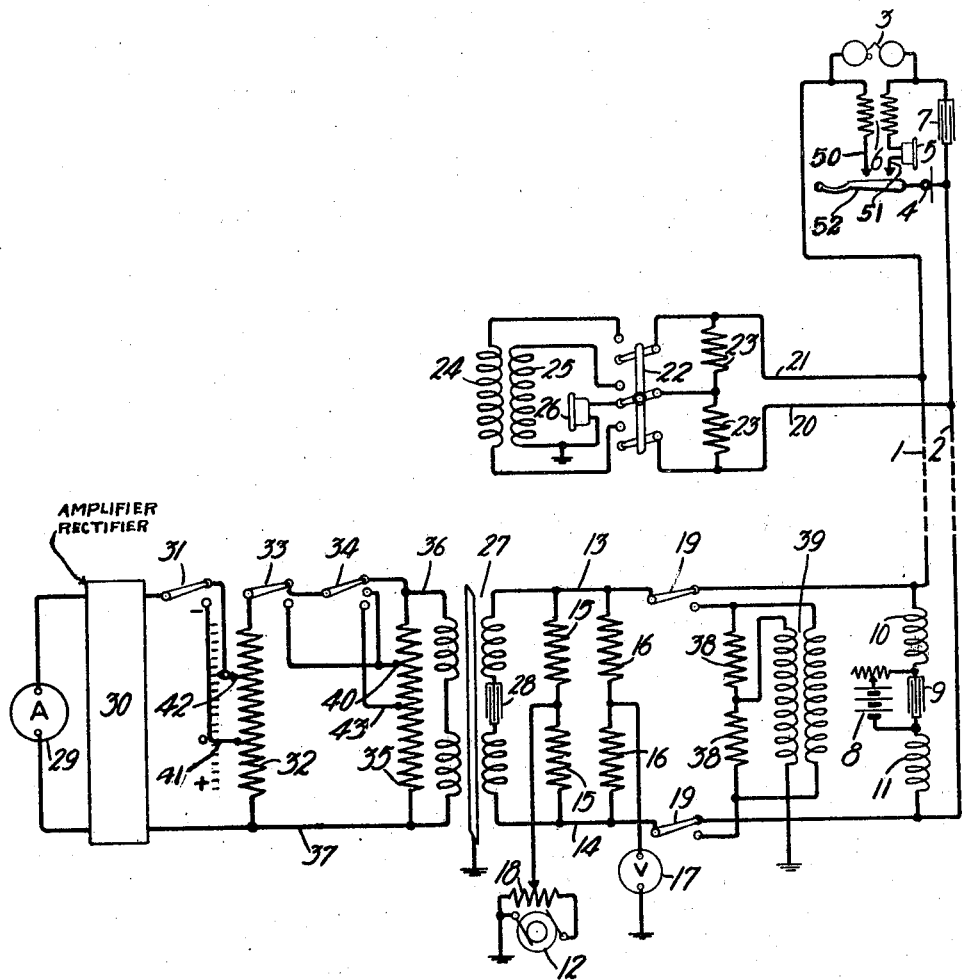
Inventor:
Harvey Fletcher.
by Joel Ch. Palmer
Atty.

Patented Jan. 6, 1925.

1,522,294

UNITED STATES PATENT OFFICE.

HARVEY FLETCHER, OF NEW YORK, N. Y., ASSIGNOR TO WESTERN ELECTRIC COMPANY, INCORPORATED, OF NEW YORK, N. Y., A CORPORATION OF NEW YORK.

ELECTRICAL TESTING SYSTEM.

Application filed January 7, 1922. Serial No. 527,581.

*To all whom it may concern:*

Be it known that I, HARVEY FLETCHER, a citizen of the United States, residing at New York, in the county of New York, State of New York, have invented certain new and useful Improvements in Electrical Testing Systems, of which the following is a full, clear, concise, and exact description.

This invention relates in general to electrical testing systems and particularly to systems for testing the efficiency of lines for the transmission of electrical currents.

One great inconvenience encountered in testing the efficiency of transmission lines is that it has usually been found necessary to locate the source of testing currents at one end of the line and the measuring devices at the other. Since neither the measuring devices nor the source of testing current are conveniently carried about it may readily be seen that a system wherein both the measuring apparatus and the source of testing current are controlled from the same station, possesses distinct advantages. One such system is disclosed in patent to Fred H. Best 1,414,397, May 2, 1922. In that patent there is described a system for testing telephone subscribers' lines in which current is impressed on the line, wires employed in a so-called simplex circuit, to actuate a standardized telephone receiver at the subscriber's station. The simplex circuit consists of the wires of the subscriber's loop in parallel with each other and connected at both ends to ground. The telephone receiver is then held at a predetermined distance from either the transmitter or receiver of the subscriber's telephone set. The sound energy of the standard receiver is thus used to generate electrical waves on the metallic line, which may be measured accurately at the central station. A comparison of the amount of energy originally transmitted and that received and measured provides an indication of the efficiency of the subscriber's line and station.

An object of the invention is to provide a measuring system of the class described, which is accurate, convenient and simple to operate; and which will measure the transmitting and receiving efficiency of the subscriber's station.

Another object is to provide a system wherein the transmission efficiency of a line is measurable independently of the efficiency of the instruments provdied at a subscriber's station, and in which such measurements may be made independently of the length of the line.

To accomplish these objects there is provided an inductive coupling of high primary impedance at the remote end of the line, which couples the simplex circuit with the metallic circuit. The current thus transmitted from the simplex circuit to the metallic circuit is measured at the originating station and the transmission efficiency determined by comparison with a standard arbitrarily established. At the testing station a source of alternating current is associated with the simplexed line circuit through a pair of accurately balanced impedances. The line is also bridged through a pair of high impedances to a voltmeter which is adjusted to indicate a constant voltage. This arrangement insures the same amount of agitation in the testing receiver for different lengths of loops, as will be explained later.

The invention may be more completely understood by reference to the following description in conjunction with the drawing, which diagrammatically represents a form of the invention as used for the measurement of the efficiency of telephone transmission lines and apparatus.

Referring to the drawing, 1 and 2 represent a telephone line terminating at a subscriber's station comprising a call bell 3, a transmitter 4, a receiver 5, an induction coil 6, and a condenser 7, obstructing the flow of direct current through call bell 3.

This arrangement of station apparatus is a common one used in centralized battery systems. Current for line 1, 2, is supplied from a source 8 shunted by a condenser 9, through inductances 10 and 11.

A source of alternating current 12 is provided, of a frequency within the range of voice vibrations and preferably about 1000 cycles since it is at such frequencies only that the transmission efficiency is of interest in telephone practice. If desired this source may have a band of frequencies within the range of voice frequency. Current source 12 is associated with a pair of leads 13 and 14, corresponding to the sides of the lines 1 and 2, respectively, through a pair of accurately balanced impedances 15, each of the order of 1000 ohms effective resistance. A balanced pair of impedances 16 of about 3000 ohms resistance, also bridge the leads 13 and 14 to a voltmeter 17 to indicate the voltage at which the current from source 12 is impressed on the simplex circuit. By adjusting the voltage impressed upon the leads 13 and 14, which is measured by the voltmeter 17, to give a constant value, in accordance with a feature of the invention, it is possible to obtain for different lengths of loops a constant intensity of sound emitted by the high impedance test receiver 26, as will be explained presently. This is very essential when comparing efficiencies of transmitters. This result is preferably accomplished by regulating the voltage of the generator 12 by means of a potentiometer device 18. A two-pole switch 19 is provided to connect leads 13 and 14 with the sides of the lines 1 and 2, respectively.

At the subscriber's station there is connected in shunt with the line 1, 2 a portable set of apparatus which includes a pair of leads 20 and 21 for connection with sides 2 and 1, respectively, of the line; a three-pole switch 22, the two outer poles of which connect with leads 20 and 21, the inner pole connecting with both leads 20 and 21 through accurately balanced impedances 23, each of which is of the order of 5000 ohms effective resistance; a low impedance transformer secondary 24 connected with the two outer contacts of switch 22; and a high impedance transformer primary 25 and a high impedance receiver 26, both of which connect with ground, and alternately contact with the inner pole of switch 22.

At the central station is also provided a grounded shield transformer 27 of which the primary is in circuit with leads 13 and 14. A condenser 28 is symmetrically interposed between two halves of the primary of transformer 27 and prevents the flow of direct current therethrough from the source 8.

By the arrangement of apparatus described above, there is provided a simplex circuit and a metallic circuit. The simplex circuit includes the current source 12, impedances 15, leads 13 and 14, sides of the line 1 and 2, impedances 23, center pole of switch 22, receiver 26 or primary 25, depending upon the position of switch 22, and thence returning by ground to the source 12. The metallic circuit includes side 1 of the line, switch 19, lead 13, primary of transformer 27, condenser 28, lead 14, switch 19, side 2 of the line and other elements depending upon the position of switch 22 and the switch hook of the subscriber's set. In testing the efficiency of the line alone, the subscriber's switchhook is kept depressed and switch 22 is in its upper position, and hence the only additional element in the metallic circuit is the low impedance secondary 24 of the transformer comprising windings 24 and 25.

In testing the transmitting and receiving efficiency of the subscriber's station switch 22 is in its lower position and points 50 and 51 are connected together by the switchhook, and hence the metallic circuit does not include transformer secondary 24, but does include transmitter 4 and the primary of induction coil 6. This represents the path which is taken by most of the oscillatory current generated at the subscriber's station. The shunts to the metallic circuit formed by impedances 15, 16 and inductances 10 and 11, are of such comparatively high impedance that comparatively little current flows through them.

A direct current ammeter 29 associated with a suitable amplifying and rectifying element 30 is connected with the secondary winding of transformer 27, through a switch 31, a slide wire potentiometer 32, a switch 33, switch 34, potentiometer 35, and leads 36 and 37.

When commencing a test of a line, switches 19 are first thrown down. Current then flows from source 12 through switches 19, impedances 38, primary of the inductive coupling 39 to ground. Induced current generated in the secondary of transformer 39 flows through switch 19, lead 13, primary of transformer 27, condenser 28, lead 14, back to the secondary of transformer 39. Switch 33 is thrown to contact with its lower pole, and switch 31, to its lower pole. Current induced in the secondary of transformer 27 then flows through lead 36, potentiometer 35 to a tap 40, switch 33, potentiometer 32 to a tap 41, switch 31, amplifying and rectifying means 30, which may be of any well known type, and, therefore, for the sake of simplicity, has not been shown in detail, ammeter 29, and lead 37, to secondary of transformer 27. This current causes an indication at ammeter 29, which is noted for future reference in connection with the line and instrument tests. It also indicates the amount of current which transformer 39, or the duplicate transformer comprising windings 24 and 25, will generate with zero loss or zero impedance in the line 1, 2. The current may be adjusted to suitable value by adjustment of potentiometer 18. Voltmeter 17 assists in obtaining a suitable preliminary adjustment.

In all tests the constants of the apparatus are such that the impedance of the line wires is negligible with respect to the impedance of the rest of the simplex circuit, but is commensurate with the impedance of the rest of the metallic circuit. For example in testing the sending or receiving efficiency of the subscriber's set, switch 22 is in its lower position and the current from source 12 traverses high impedances 15, line wires 1 and 2 in parallel, high impedances 23 and high impedance receiver 226. With the lengths of subscribers' loops met in practice, the impedance of line wires 1 and 2 in parallel is negligible in effect with respect to the combined impedance of resistances 15, 23 and receiver 26 as connected. Hence, for practical purposes, the length of the loop will not affect the amount of current delivered to receiver 26 by a constant voltage as indicated by voltmeter 17, or in other words, receiver 26 will give a constant volume of sound output regardless of the length of the loop. Similarly the impedance of primary winding 25 is high, and the current delivered to it is not affected by the length of loops which are met in practice.

It should be noted, however, that resistances 15 and 23 and high impedance receiver 26 (or winding 25) are not a part of the metallic circuit and the impedance of winding 24 and primary of transformer 27 being low, the impedance of the line wires is commensurate with the entire impedance of the metallic circuit. For this reason there is no difficulty in measuring the attenuating effect of the line wires upon the current delivered from the subscriber's station over the metallic circuit to the primary of transformer 27.

The subscriber's line 1, 2 is then tested by moving switches 19, 22, 31 and 33 to their upper positions and switch 34 to its center position. The simplex circuit is then completed through transformer primary 25 to ground, and the metallic circuit is completed through transformer secondary 24, as above described. In this test the switchhook 51 is kept depressed and the impedance of the ringer 3 in series with condenser 7 is so high that only a negligible portion of the current induced in the transformer secondary 24 traverses this path. Current is induced as before in the secondary of transformer 27 and takes the path including lead 36, potentiometer 35, tap 40, switch 34, switch 33, potentiometer 32, to an adjustable tap 42, switch 31, element 30, and lead 37. A reading is obtained on ammeter 29 as before, and tap 42 is adjusted until this reading is the same as that previously obtained using transformer 39. A scale associated with adjustable tap 42 is preferably provided having its zero point corresponding to tap 41, to indicate the position which tap 42 would occupy if the line has no loss in transmission efficiency. The deviation of the resulting position from this point indicates the loss or gain in efficiency in the line being measured. In this test, the transmission loss of the line, exclusive of the subscriber's station, is indicated.

In testing the efficiency of the line the final displacement of tap 42 from tap 41 is a measure of the ratio of the currents delivered to the primary of transformer 27 when employing transformer 39 and that comprising the windings 24 and 25. This allows the scale associated with tap 42 to be calibrated to read directly the efficiency of the transmission line in terms of miles of standard cable, or other suitable transmission unit.

If the current delivered to the primary of transformer 27 from transformer secondary 24 is less than that delivered to the primary of transformer 27 by the secondary of transformer 39, the subscriber's line causes a loss, which is denominated a loss in efficiency and may be evaluated in terms of minus transmission units such as miles of standard cable. In case the current delivered by transformer secondary 24 is greater than that delivered by the secondary of transformer 39 there is a gain which would be evaluated in positive transmission units.

Transmission efficiency such as efficiency in miles of standard cable, which may be either positive or negative, should not be confused with the ordinary power efficiency, which is the ratio of the energy delivered by a piece of apparatus to the energy supplied to the apparatus. The basis for expressing the transmission efficiency of a piece of telephone equipment or a telephone line as "n" miles of standard cable is that the piece of equipment or line causes a reduction in the power received over the circuit in which it is placed, which is the same as the difference in the amounts of power at two points "n" miles apart along a length of standard cable. If current is being supplied over a transmission line and points 1 and 2 which are "n" miles apart are considered, the ratio of the amount of power at these two points is equal to the square of the ratio of the currents, or to the square of the ratio of the voltages, at these two points and this ratio can be expressed in terms of the attenuation per mile of the line, viz.

$$\sqrt{\frac{P_2}{P_1}} = \frac{I_2}{I_1} = \frac{E_2}{E_1} = \epsilon^{-na}$$

where P, I and E equal power, current and voltage respectively and the subscript shows whether the quantity is at a point 1 or point 2. $a$ is the attenuation constant per mile of the line. The square root of the ratio of the amount of power received over a telephone circuit with a piece of equipment in the circuit to the amount of power received when the piece of equipment is replaced by a standard piece is sometimes called the "equivalent current ratio" and can be used as a measure of the change produced in the circuit. From this equivalent current ratio a corresponding attenuation can be obtained. This attenuation divided by the attenuation per mile of standard cable for a particular frequency gives the efficiency in miles of standard cable at that frequency. To illustrate:—

$$\frac{P'_1}{P'_2} = \epsilon^{a'}$$

where at a certain frequency $P'_1$ is the amount of power received over a telephone circuit with a piece of equipment, and $P'_2$ is the amount of power at the same frequency received if the piece of equipment is replaced by a standard piece. $a'$ is the attenuation constant corresponding to this "equivalent current ratio". Therefore, using $a$, the attenuation constant per mile of standard cable for the same frequency (from the equation on the preceding page) as the denominator of a fraction of which $a'$ is the numerator, gives the efficiency of the piece of apparatus in miles of standard cable;

viz. $\frac{a'}{a}$ = efficiency in miles of standard cable.

In determining the efficiency of a subscriber's loop the standard would be taken as a zero loop and hence the efficiency of the loop would be the number of miles of standard cable which would cause an attenuation either positive or negative, equal to that caused by the subscriber's loop. This would be expressed as miles positive or miles negative, as the case might be. In the case of the efficiency of transmitters and receivers comparison would be made to a standard transmitter or a receiver, as the case might be.

It is seen from the foregoing equation that if the current ratio is known, the equivalent miles of standard cable can be obtained without the incorporation of any other quantity than the attenuation constant per mile of standard cable for a particular frequency and, since this known, the scale associated with tap 42 may be calibrated to read directly in terms of miles of standard cable, or other suitable transmission unit. If the final setting is obtained with tap 42, above tap 41 there is a loss in efficiency equal to the number of miles of standard cable indicated, whereas if the final setting is obtained with tap 42 below tap 41, there is a gain in efficiency equal to the indicated number of miles of standard cable.

The next test to be made is for receiving efficiency at the subscriber's station. For this test, switch 22 is thrown to its position connecting receiver 26 in the simplex circuit and disconnecting the transformer primary 25 and secondary 24. The switchhook is placed in its upper position, thus connecting 50 and 51. Receiver 26, which under the conditions mentioned, emits the same intensity of sound for all loop lengths met with in practice, is held at a predetermined distance from receiver 5 such that the force exerted upon the diaphragm of all receivers thus tested, may be uniform. The magneto current thus generated induces a current in the metallic circuit above described through the medium of induction coil 6. Switch 34 is thrown to the position shown in the drawing. In this position of switch 34 less resistance of element 35 is included in the current measuring circuit than was included in the previous test, and the included resistances in each case are made to be in inverse proportion to the relative generating efficiency of standard receivers and the transformer comprising windings 24 and 25. Induced current then flows from the secondary of transformer 27 through lead 36, switch 34, switch 33, potentiometer 32 to adjustable tap 42, switch 31, element 30, and lead 37. The position of tap 42 is adjusted as before until the initial reading of ammeter 29 is again obtained. The deviation of the resulting position of tap 42 from the position indicating standard efficiency as above referred to, indicates in this case the discrepancy in receiving efficiency of the subscriber's station. Due to the shift of switch 34 the displacement of tap 42 gives the efficiency to the same scale as in the line test.

To test the transmitting efficiency of the subscriber's station, receiver 26 is held a standard distance from the transmitter 4, thus causing the same force to be exerted upon all tested transmitters. Oscillations set up in the metallic circuit as before, cause induced current in the secondary of transformer 27, which follows the path through lead 36, potentiometer 35 to a tap 43, switch 34 being thrown to its lower position, switch 33, tap 42, switch 31, element 30, and lead 37. As in the two cases above described, the ammeter indication should remain the same as originally set when tap 42 is adjusted to the point indicating standard efficiency, and the amount of adjustment necessary to obtain such an indication constitutes a measure of the deviation from standard efficiency. With switch 34 in its lower position the amount of resistance 35 in the current measuring circuit as compared to the amount in the circuit when transformer 39 was employed is in inverse proportion to the relative generating efficiencies of standard transmitters and the transformer comprising windings 24 and 25, which is a duplicate of transformer 39.

The system as above described provides a very convenient means for rapidly testing all phases of the efficiency of a subscriber line. It is an improvement over the method of the F. H. Best patent referred to above, since from its results, more accurate deductions may be may as to conditions causing failure of performance. In a receiver test the results obtained include the combined efficiency of the receiver and the transmission line and likewise in the transmitter test the result given by the position of tap 42 indicates the combined efficiency of the transmitter and the line. These combined efficiencies have been termed the receiving and transmitting efficiencies of the subscriber's station, respectively. However, in the line test the efficiency of the line alone was obtained and hence this can be deducted from the results obtained in the transmitter and the receiver tests to obtain the transmitting and receiving efficiencies of the subset alone. Also the test may be made more rapidly and with less chance of error.

The calibration of the measuring portion of the circuit by means of transformer 39, suffices for a number of tests and when once accomplished, is used only as a check upon the accuracy of the test at future times.

What is claimed is:

1. In an electrical testing system, a metallic line circuit to be tested, a simplex circuit superimposed on said line circuit, a source of testing current associated with the simplex circuit, inductive means energized by current in the simplex circuit to generate current in the metallic circuit, and means to measure the current flowing in the metallic circuit.

2. In an electrical testing system, a metallic line circuit to be tested, a simplex circuit, superimposed on said line circuit, a source of testing current associated with the simplex circuit, inductive means energized by current in the simplex circuit to generate current in the metallic circuit, and means associated with the metallic circuit at a point remote from said inductive means to measure the current flowing in the metallic circuit.

3. In an electrical testing system, a transmission line to be tested, and an associated telephone station to be tested for transmitting and receiving efficiency, means to connect the line in simplex circuit, a source of current connected to said simplex circuit at a distance form said station, means energized by current from said source to apply definite amounts of power to said line, said receiver, and said transmitter; and means to measure the resulting current delivered over the line to a point near said source, to indicate to the same scale the transmission efficiency of said line and the receiving and sending transmission efficiency of said station.

In witness whereof, I hereunto subscribe my name this 6th day of January A. D., 1922.

HARVEY FLETCHER.